United States Patent
Womble et al.

[15] 3,702,639
[45] Nov. 14, 1972

[54] SPRING BIASED COUPLING MEMBER ON A DISK GANG FOR DRIVING ENGAGEMENT WITH A FOLDING WING GANG COUPLING MEMBER

[72] Inventors: George E. Womble; Rex Cleveland, both of Kewanee, Ill.

[73] Assignee: Kewanee Machinery & Conveyor Co., Kewanee, Ill.

[22] Filed: Sept. 11, 1970

[21] Appl. No.: 71,299

[52] U.S. Cl. ................ 172/568, 172/743, 192/67 R
[51] Int. Cl. .....A01b 21/08, A01b 65/02, F16d 11/00
[58] Field of Search....172/311, 456, 568, 598, 599; 192/67

[56] References Cited

UNITED STATES PATENTS

| | | | |
|---|---|---|---|
| 2,114,633 | 4/1938 | Hedges | 192/67 R |
| 2,917,019 | 12/1959 | Krueger | 192/67 R |
| 2,973,738 | 3/1961 | Ladewig | 192/67 R |
| 3,102,598 | 7/1963 | Mighell | 172/568 |
| 3,529,675 | 9/1970 | Wheeler | 172/568 |

FOREIGN PATENTS OR APPLICATIONS 423,757    3/1950    Italy .................... 192/67 R

*Primary Examiner*—Robert E. Pulfrey
*Assistant Examiner*—C. W. Hanor
*Attorney*—Johnson, Dienner, Emrich, Verbeck & Wagner

[57] ABSTRACT

A coupling for interconnecting a generally stationary main disk gang of a disk harrow and a wing gang movable to a position axially aligned with and establishing an extension of the main disk gang, the coupling including a first coupling member having radial drive lugs and supported by one of the cooperating pair of disk gangs for axial sliding, a second coupling member supported in axial relation on the other of the disk gangs and having recesses formed to receive the drive lugs in driving relation, and spring means operative with the first coupling member to allow the disk gangs to be brought into generally axial alignment and effect driving coupling therebetween without radial alignment of the driving lugs and receiving recesses therefor.

4 Claims, 7 Drawing Figures

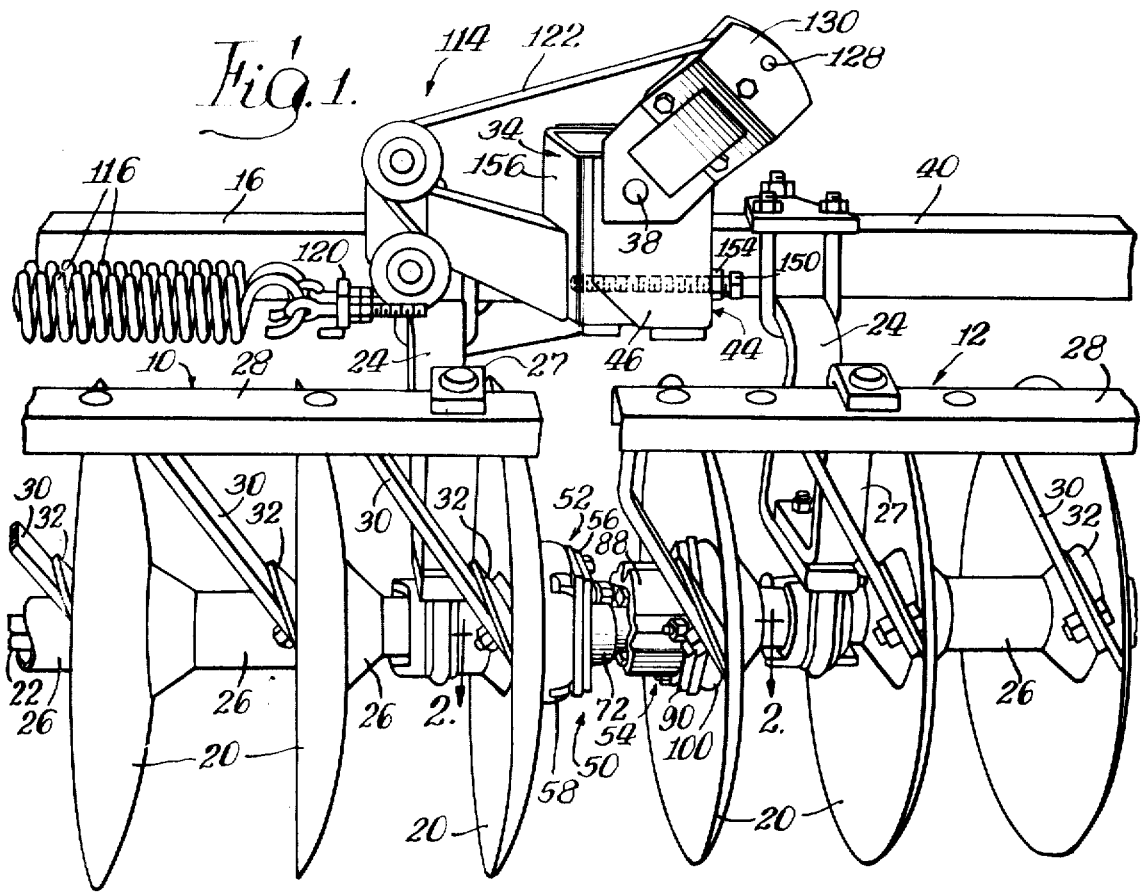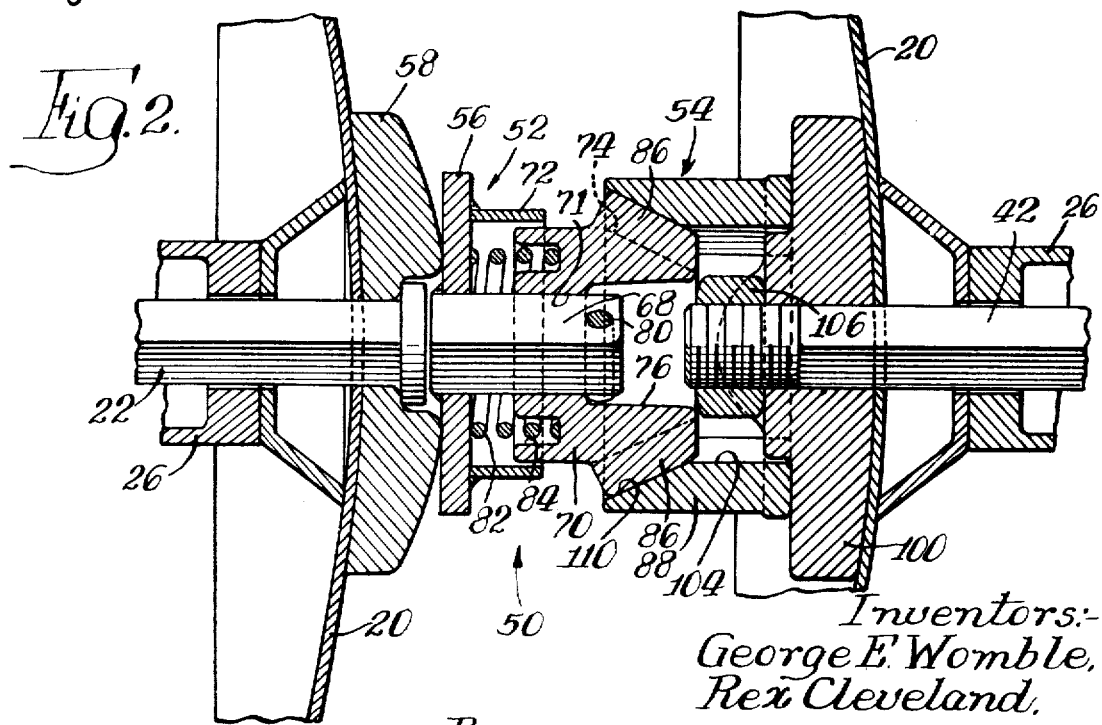

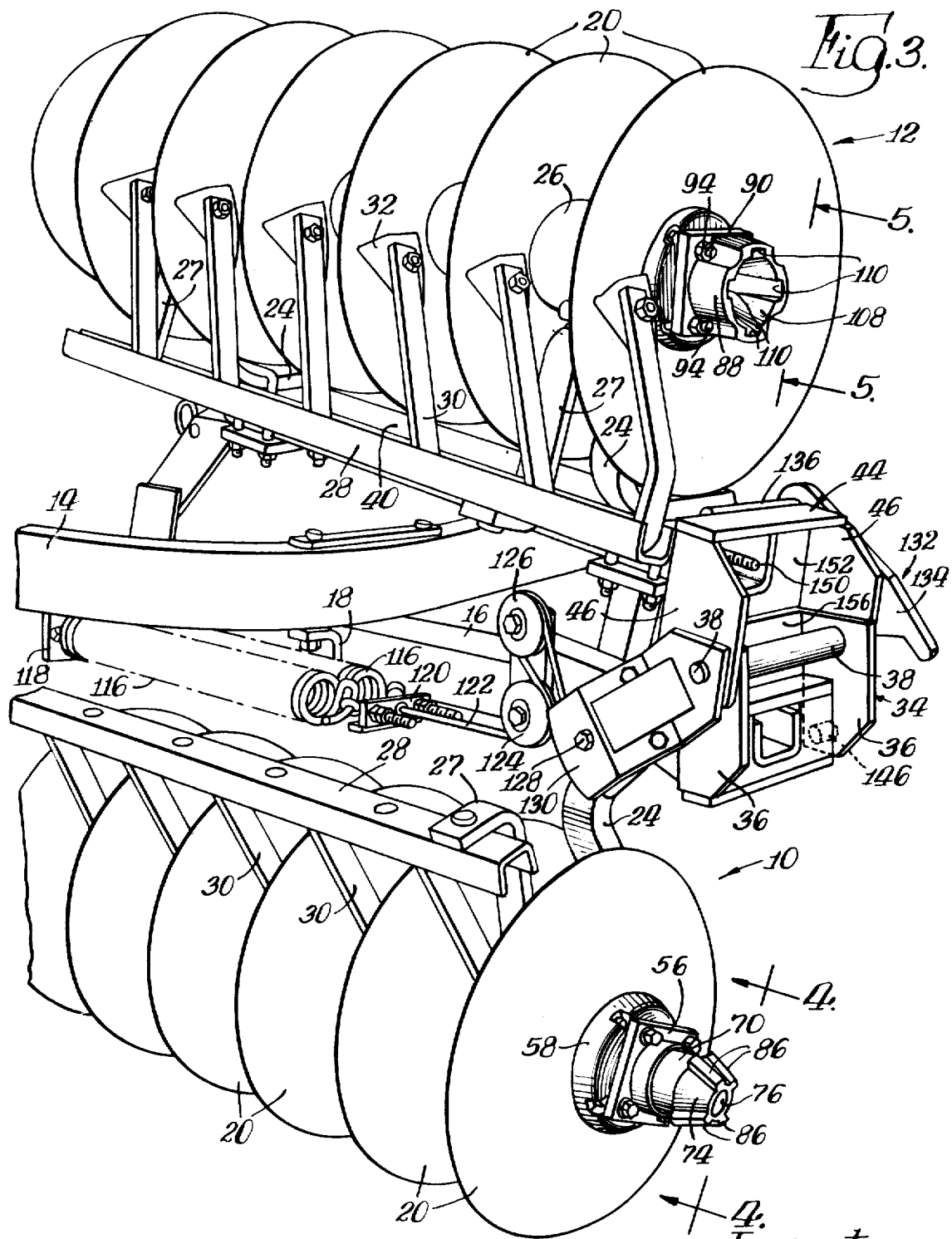

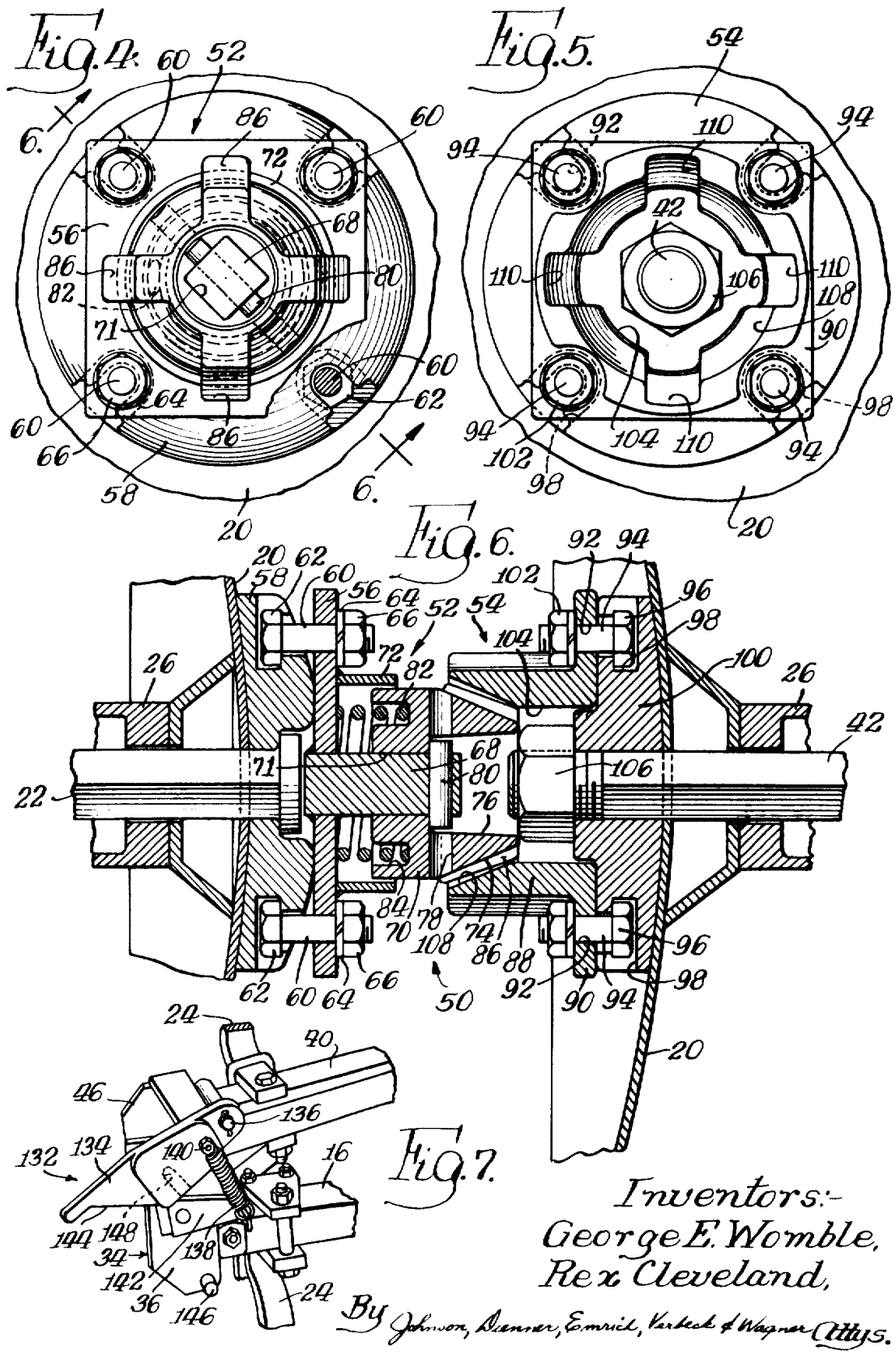

SPRING BIASED COUPLING MEMBER ON A DISK GANG FOR DRIVING ENGAGEMENT WITH A FOLDING WING GANG COUPLING MEMBER

BACKGROUND OF THE INVENTION

The present invention relates to couplings, and more particularly to a coupling for use between main and wing disk gangs of a disk harrow.

It is known in the manufacture of farm implements employing rotary ground working tools such as in disk harrows to provide a releasable coupling between the independent rotary gangs to allow selective driving coupling therebetween. It is known to pivotally support the wing disk gangs for movement between positions wherein they generally overlie the stationary main disk gangs to positions axially aligned with the associated main disk gangs, a coupling being effected between the adjacent aligned ends of each pair of main and wing disk gangs to establish a driving rotational engagement therebetween. Heretofore, the couplings provided between such stationary and movable disk gangs have required the disk gangs to be brought into a specific rotational orientation relative to each other in order to effect coupling therebetween after the wing disk gangs are moved into axial alignment with the associated main disk gangs. For example, U. S. Pat. No. 3,102,598 discloses a wing gang coupling for use between main and wing gang sections of a disk harrow, which coupling requires that one of the coupling members be rotated to a specific position relative to the other coupling member to allow interengagement therebetween. The present invention provides a coupling for use between main and wing disk gangs which does not require particular rotational orientation of the coupling members before the wing gang can be brought to a position axially aligned with the main disk gang.

SUMMARY OF THE INVENTION

One of the primary objects of the present invention is to provide a coupling adapted to effect driving relation between a main and associated wing disk gang of a disk harrow without requiring the wing gang to be brought into specific rotational and axial alignment with the main wing gang.

Another object of the present invention is to provide a drive coupling for use between an associated pair of main and wing disk gangs wherein the coupling includes a first coupling member slidably supported on one of the disk gangs for rotation therewith, the first coupling member having drive lugs thereon cooperable with a second coupling member supported on the other of the disk gangs, the coupling further including resilient means urging the first coupling member into the second coupling member to effect a driving relation therebetween as the wing gang is brought toward a position axially aligned with the main disk gang.

In carrying out the objects and advantages of the present invention, we provide a first coupling member having a coupler base secured adjacent the convex surface of the outermost disk of a rearward main disk gang, or the convex surface of the innermost disk of a forward wing disk gang, in axial alignment therewith. The coupler base has a square drive shaft which supports a first truncated conical coupling member having radially outwardly projecting tapered drive lugs spaced thereabout. The first coupling member is limited in its outward sliding movement on the associated square support shaft and a compression spring is disposed between the coupler base and the first coupling member to urge the coupling member axially outwardly. A second coupling member is supported in axial relation on the associated wing or main disk gang, as on the concave side of the next adjacent disk opposing the first coupling member, and includes a conical recess having radially recessed slots therein adapted to receive the drive lugs on the first coupling member. As the wing gang is moved from an inoperative position generally overlying the associated main disk gang to an operative position approaching alignment with the main disk gang, the second coupling member receives the truncated conical portion of the first coupling member therein. If the drive lugs are not in rotational alignment with the corresponding recesses in the second coupling member, the first coupling member will be urged into the coupler base. Subsequent rotational movement of the main disk gang, with the first coupling member being biased axially outwardly, causes the drive lugs to engage the associated recesses within the second coupling member whereby to effect driving rotation therewith. In this manner, driving rotational movement of the wing disk gang can be effected without the wing disk gang being in axial alignment with the main disk gang, and without the need for separate locking means associated with the drive coupling.

Further objects and advantages of the present invention, together with the organization and manner of operation thereof, may best be understood by reference to the following description of a preferred embodiment of the invention when taken in conjunction with the accompanying drawings in which like reference numerals designate like parts throughout the several views.

BRIEF DESCRIPTION OF THE DRAWINGS:

FIG. 1 is a partial elevational view of a main disk gang operatively coupled to a pivotally supported wing disk gang through coupling means in accordance with a preferred embodiment of the present invention;

FIG. 2 is an enlarged longitudinal sectional view of the drive coupling between the main and wing disk gangs of FIG. 1, taken substantially along the line 2—2 of FIG. 1 and looking in the direction of the arrows;

FIG. 3 is a perspective view of the main and wing disk gangs of FIG. 1, the wing disk gang being illustrated in its inoperative position generally overlying the main disk gang;

FIG. 4 is an end view of the coupling member associated with the main disk gang, taken substantially along the lines 4—4 of FIG. 3 and looking in the direction of the arrows;

FIG. 5 is an end view of the coupling member associated with the wing disk gang taken along the line 5—5 of FIG. 3 and looking in the direction of the arrows;

FIG. 6 is an enlarged longitudinal sectional view of the drive coupling in accordance with the present invention, being taken along line 6—6 of FIG. 4 and looking in the direction of the arrows; and FIG. 7 is a partial perspective view of the automatic latch arrangement for securing the main and wing disk gangs in operative aligned relation.

DESCRIPTION OF A PREFERRED EMBODIMENT

Referring now to the drawings, and in particular to FIGS. 1 – 3, we have illustrated our invention, by way of illustration, in conjunction with a disk harrow having at least one main generally stationary disk gang, indicated generally at reference numeral 10, and an associated wing disk gang, indicated generally at 12. The illustrated main disk gang 10 and wing disk gang 12 comprise rearward gang sections of a conventional disk harrow having a generally rectangular main frame, a portion of which is indicated at 14, adapted to be pulled behind a tractor or the like. Conventionally, two main disk gangs 10 are secured to the rearward portion of the frame 14 through rigid elongated beams 16 received through and secured to the undersurface of the frame 14 by U-shaped mounting brackets, one of which is indicated at 18. The rigid beam 16 of the rearward main disk gang 10 may be angularly disposed relative to the longitudinal axis of the disk harrow frame 14 and is adapted to support a plurality of parallel concave disk blades 20 for rotation about the axis of an elongated gang bolt 22 of square cross section through standards or hangers 24, an example of which is described and illustrated in copending application, Ser. No. 7,614, filed Feb. 2, 1970, and assigned to the assignee of the present invention.

The disk blades 20 of the rear pair of main disk gangs have their concave surfaces directly inwardly toward the longitudinal axis of the harrow frame 14. Conventionally, the harrow frame 14 also supports a pair of forward main disk gangs similar to 10 but having the concave surfaces of the associated disk blades directed outwardly from the longitudinal axis of the harrow frame. The disk blades 20 of the main disk gang 10 are maintained in longitudinally spaced relation along the associated gang bolt 22 through spools 26 in a known manner. The support standards 24 associated with each of the stationary main disk gangs, such as 10, have support brackets 27 mounted thereon which serve to support an elongated channel 28. The channels 28 support a plurality of downwardly inclined scraper bars 30 corresponding to and disposed rearwardly of each of the spaced concave disks 20, each of the scraper bars 30 having a scraper 32 secured to the lower end thereof in a manner to engage the concave surface of the associated disk 20.

It is known in the construction of disk harrows having stationary disk gangs 10 secured to the main frame 14, to also provide auxiliary wing gangs, such as indicated at 12. The wing gangs 12 are each operatively associated with a main disk gang 10 and are movable from inoperative positions within the overall side-to-side dimension of the main disk gangs to operative positions wherein each wing gang forms an axially aligned extension to its associated main disk gang thereby extending the overall working width of the harrow. To this end, we provide a support bracket 34 on the outermost end of the elongated support beam 16 of each main disk gang 10, the support brackets being affixed to their associated rigid beams by welding or other suitable means. Noting FIG. 3, each support bracket 34 comprises a generally vertically disposed U-shaped channel having parallel spaced side flanges 36 which support a pivot shaft 38 therebetween with the longitudinal axis of the pivot shaft disposed in horizontal relation transverse to the longitudinal axis of the associated rigid beam 16. Each of the wing gangs 12 includes a rigid elongated beam 40 which supports a plurality of spaced concave disk blades 20 on an elongated wing gang bolt 42 (FIG. 2) of square cross section through support standards or hangers 24 in similar fashion to the main disk gangs 10. The concave disks 20 of the wing disk gang sections 12 are similarly maintained in spaced relation along the gang bolt 42 through spools 26. Similarly, the wing disk gangs 12 may be provided with scrapers 32 supported on scraper bars 30 which are secured to support channels 28.

The rigid beam 40 of each of the wing disk gangs 12 is pivotally mounted on the pivot shaft 38 of the corresponding main disk gang 10 through a U-shaped support bracket 44 having parallel spaced side flanges 46 adapted to be received over the spaced side flanges 36 of the associated support bracket 34, the side flanges 44 having aligned apertures therethrough to receive the outer opposed ends of the support shaft 38. In this manner, each wing disk gang 12 is movable between a position overlying the associated main disk gang 10, as shown in FIG. 3, to a position wherein the rigid beam 40 of the wing gang is axially aligned with the rigid beam 16 of the main disk gang 10. The configuration of the support standards 24 in relation to the associated rigid beams 16 and 40 are such that the wing gang bolt 42 of the wing disk gang 12 is identically related to its associated rigid beam 40 as the main gang bolt 22 of the main disk gang 10 is related to its rigid elongated beam 16. In this fashion, with the wing disk gang 12 in its operative position, the associated disks 20 and gang bolt 42 will be axially aligned with the axis of the gang bolt 22 of the main disk gang 10. It will be understood that the disks 20 of the forward wing gangs are supported such that their concave surfaces are directed outwardly when the forward wing gangs are lowered, while the disks 20 of the rearward wing gangs are supported such that their concave surfaces are directed inwardly when in lowered positions.

The present invention is primarily directed to coupling means, indicated generally at 50, operatively associated with the main and wing disk gangs 10 and 12, respectively, for effecting driving rotational movement of the disks 20 of the wing disk gang 12 upon rotational movement of the disks 20 of the main disk gang 10 during movement of the disk harrow with the disks of the main disk gang engaging the ground in a known manner. For purposes of illustration, the coupling means 50 is described in conjunction with the rear main disk gang 10 and associated wing disk gang 12. When used between a forward main disk gang and associated wing disk gang, the mounting of the coupling means portions is reversed, as will become more apparent hereinbelow. The coupling means 50 includes a first coupling portion, indicated generally at 52, supported by the rearward main disk gang 10 in axial alignment with the axis of the disks 20 thereof, and a second coupling portion, indicated generally at 54, supported by the wing disk gang 12 in axial alignment with the axis of the wing disks 20. The first coupling portion 52 includes a coupler base 56 comprising a generally square planar plate secured to a flange or gang bumper 58 on the disk gang bolt 22 adjacent the convex surface of the outer disk 20 of the disk gang 10. Noting FIGS. 4 and 6, the coupler base plate 56 is secured to the flange 58 through four retaining bolts 60 having heads 62 received within T-shaped slots in the flange 58, the opposite ends of the retaining bolts 60 having lock washers 64 and nuts 66 thereon.

The coupler base plate 56 has a square drive spindle 68 secured in normal relation to the plane of the base plate through welding or other suitable means. The drive spindle 68 extends outwardly in axial alignment with the gang bolt 22 and slidably receives a wing driver member 70, termed the male wing drive member, thereon for axial movement along the drive spindle 68. To this end, the wing male drive member 70 has a square axial bore 71 slidable over the drive spindle 68, and has a rear portion having an outer cylindrical surface adapted to be received within an annular walled flange 72 suitably secured to the outer surface of the coupler base plate 56. The outermost end of the male wing drive member 70 has a generally truncated conical surface 74 disposed about a slightly tapered axial recess or bore 76 formed in axial alignment with the square bore 71. A transverse through-bore 78 is provided in the male drive member 70 generally intermediate its axial length to allow insertion of a cylindrical keeper pin 80 through an appropriate transverse bore in a square drive spindle 68. The keeper pin 80 has a diameter less than the diameter of bore 78 and has a length less than the smallest diameter of the tapered recess 76 in the male drive member 70. The keeper pin 80 serves to limit outward movement of the male wing drive member 70 on the drive spindle 68 while allowing rearward movement thereof. A coil compression spring 82 is disposed about the square drive spindle 68 and has one end abutting the outer surface of the coupler base 56 and its opposite end received within an annular groove 84 formed in the rearward surface portion of the male drive member 70 so as to urge the drive member axially outwardly from the coupler base. Noting FIG. 2, taken in conjunction with FIGS. 3 and 4, the male wing drive member 70 has four equidistant circumferentially spaced drive lugs 86 which project generally radially outwardly from the truncated conical surface 74 and are tapered downwardly toward the outermost end of the male wing drive member, as considered in FIG. 2.

The second coupling portion 54 of the coupling means 50 includes a female wing drive member of socket 88 having a generally planar flange 90 lying in a plane normal to the longitudinal axis of the socket 88. Noting FIGS. 5 and 6, the flange portion 90 is of generally square configuration having corner holes 92 therethrough to receive attaching bolts 94 which have heads 96 received within T-shaped slots 98 in a flange or gang bumper 100 secured to the concave surface of the innermost disk 20 of the wing disk gang 12. Lock nuts 102 are secured on the ends of the bolts 94 opposite the heads 96 to retain the driven wing socket 88 on the gang flange 100 for conjoint movement therewith.

The female wing drive socket 88 has a generally cylindrical bore 104 forming axially therethrough, the diameter of the axial bore 104 being sufficient to accommodate a nut 106 secured on the innermost end of the gang bolt 42 of the wing disk gang 12. The end of the axial bore 104 opposite flange 100 terminates in a generally conical recess 108 of a size and configuration generally similar to the truncated conical surface 74 of the male wing drive member 70 such that during coupling cooperation, the truncated conical surface 74 of the male wing drive member 70 will nest within the conical surface 108 of the female wing drive socket 88. The conical recess 108 has four tapered driving recesses 110 formed in equidistantly circumferentially spaced relation within the conical recess 108, the driving recesses 110 being of substantially identical configuration to the drive lugs 86 so as to receive the raised drive lugs during coupling as will be more fully described hereinbelow.

Noting FIG. 1, taken in conjunction with FIG. 3, the disk harrow employing the stationary main disk gang 10 and wing disk gang 12 includes counterbalance means, indicated generally at 114, for counterbalancing the wing disk gang 12 as it is moved from its upper inoperative position, as shown in FIG. 3, to its lowered operative position in axial alignment with the main disk gang 10. The counterbalance means 114 includes a pair of coil tension springs 116 having their inner ends connected to a depending bracket 118 affixed to the side surface of the support beam 16. The opposite ends of the tension springs 116 are connected to a connector plate 120 through suitable eye bolts. A flexible cable 122 has one end secured to the connecting plate 120 and is reeved over a pair of rotatably supported pulleys 124 and 126 with the other end of the cable being secured to a connecting bolt 128 fixed on a bracket 130. The bracket 130 is secured to one of the side flanges 46 of the support bracket 44 as by welding for rotational movement with the support bracket. It can be seen that when the wing disk gang 12 is moved from its uppermost position as shown in FIG. 3 to its lowered operative position as shown in FIG. 1, the tension springs 116 will be elongated effecting a counterbalance force on the wing disk gang. The springs 116 are selected so that the counterbalance force offsets the force moment created by the weight of the wing gang as it is rotated downwardly about its pivot axis 38.

The disk harrow employing the main disk gang 10 and wing disk gang 12 also includes automatic latch means which serves to limit the extent of downward rotational movement of the wing disk gang and prevent excessive axial loading between the coupling members 52 and 54. The automatic latch means further serves to maintain the wing disk gang in its downward operative position until it is desired to move it to its upward inoperative position. Noting FIGS. 3 and 7, the automatic latch means is indicated generally at 132 and includes a latch member 134 pivotally mounted on a pivot shaft 136 which is secured to the support bracket 44 on the wing disk gang 12 for conjoint movement therewith. The latch member 134 is urged in a counter-clockwise direction about the pivot shaft 136, as considered in FIG. 7, by a coil tension spring 138 having one end secured to the latch member as by connecting screw 140 and the opposite end secured to a bracket 142 affixed to the associated side flange 36 of the support bracket 34. The latch member 134 has a ramp or guide edge surface 144 angularly inclined relative to the longitudinal axis of the latch member, which guide surface is caused to engage an outwardly extending lock pin 146 secured in normal relation to the side flange 36 as the wing disk gang is moved to its lowered position about the pivot axis 38. The latch member 134 includes an arcuately shaped recess 148 adapted to receive the lock pin 146 therein when the wing disk gang is moved to its lowered operative position. The relative position of the recess 148 in the latch member 134 and the position of the stop pin 146 on the side flange 36 are such that the stop pin will be received within the recess 148 and prevent the wing gang beam 40 from raising without first rotating latch member 134 to disengage stop pin 146. The tension spring 138 is sufficient to cause the lock pin 146 to be maintained within recess 148 until it is desired to move the wing disk gang upwardly to its inoperative position by manually rotating the latch member 134 about its pivot axis 136 to release lock pin 146 from the recess 148. The automatic latch means 132, per se, forms no part of the present invention and is described in greater detail in the copending application of George E. Womble and Lorrin H. Schwartz, Ser. No. 44,793, filed June 9, 1970, and assigned to the assignee of the present invention.

Noting FIGS. 1 and 3, a threaded wing stop bolt 150 is received through a suitable opening in the web portion 152 of support bracket 44 and is longitudinally adjustable through lock nuts disposed on the stop bolt on opposite sides of the web plate 152, one of the lock nuts being shown at 154. The inner end of stop bolt 150 is adjusted to engage the web portion 156 of support bracket 34 when the wing gang 12 is lowered to a desired position, and thus serves as a means to selectively vary the lowered position of the wing gang extension relative to the main desk gang 10 as described more fully in the copending application, Ser. No. 44,793.

Having thus described a preferred embodiment of the coupling 50 used in conjunction with the main disk gang 10 and movable wing disk gang 12 to effect driving rotational movement between the respective disks thereof, its operation will be briefly reviewed. When it is desired to utilize the wing disk gang 12 as a disk extension of the main disk gang 10, the wing disk gang is pivoted downwardly from its upper inoperative position as shown in FIG. 1 against the counterbalance force established by the counterbalance means 114. Moving the wing disk gang 12 downwardly causes the drive lugs 86 on the male wing drive member 70 to be received within the conical recess 108 in the female wing drive socket member 88. If the drive lugs 86 on the male wing drive member 70 are not exactly rotationally aligned with the radial recesses 110 in the female wing drive socket 88, the male wing drive means 70 will be urged axially rearwardly against the force of compression spring 82. The configuration of the male wing drive member 70 is such that it may be so moved rearwardly within the annular wall flange 72 of the coupler base 56 a distance sufficient to allow the wing disk gang 12 to be moved to a position wherein the disks 20 thereof are substantially axially aligned with the disks 20 of the main disk gang 10. Subsequent rotational movement of the disks of either the main disk gang 10 or the wing disk gang 12, as during a normal disking operation, will cause the drive lugs 86 on the male wing drive member 70 to be received within the drive recesses 110 in the female wing drive socket 88 due to the spring force 82 to effect a driving coupling relation between the main and wing disk gangs 10 and 12.

It can be seen that spring loading of the male wing drive member 70 allows the main and wing disk gangs to be brought into aligned cooperating relation even when the male drive member 70 and female drive socket 88 are not in exact radial or rotational alignment. The compression spring 82 further serves to snap the drive lugs 86 into the corresponding recesses 110 in the female drive socket 88 when rotational operation of either of the disk gangs is subsequently effected. The coupling members 52 and 54 are adapted to effect driving rotational movement therebetween even though the main and wing disk gangs are not in exact axial alignment due to the drive lugs 86 being at least partially received within the driving recesses 110 as the wing disk gang is pivoted downwardly. As noted above, the locking recess 148 of the automatic latch means 132 is caused to receive the lock pin 146 therein in locking relation when the wing disk gang 12 is moved to substantially axial alignment with the main disk gang 10, the stop bolt 150 being adjusted to engage the web portion 156 of bracket 34 and absorb the axial load force resulting from the wing disk gang, thereby preventing such axial load force from acting on the coupling 50. The latch means 132 serves to prevent undesirable upward movement of the wing disk gang 12 due to the counterbalance means 114 when the wing disk gang is in its lowered operative position.

As noted, the coupling means 50 was described in conjunction with a rearward main disk gang 10 and associated wing disk gang which have their disks 20 supported such that the concave surfaces of the disks are directed inwardly toward the longitudinal axis of the disk harrow. When used in conjunction with a forward main disk gang and associated wing disk gang having the concave surfaces of their discs directed outwardly from the longitudinal axis of the disk harrow, the coupling portions 52 and 54 are reversed such that the male wing drive member 70 is supported on the wing disk gang and the female wing drive socket 88 is supported on the main disk gang. Thus, the male wing drive member 70 is supported adjacent the convex side of the innermost wing disk, while the female wing drive socket is supported adjacent the concave surface of the outer opposing disk of the main disk gang.

While a preferred embodiment of the present invention has been illustrated and described, it will be understood to those skilled in the art that changes and modifications may be made therein without departing from the invention in its broader aspects.

We claim:

1. In an agricultural implement having a main frame, at least one main disk gang supported by said frame and having a plurality of axially aligned rotatable disks for engagement with the ground, at least one wing disk gang having a plurality of axially aligned rotatable disks supported by said frame for movement between a first position wherein the wing disks do not engage the ground and a second position wherein the axis of the wing gang disks is generally axially aligned with the axis of the main gang disks so that the wing disks engage the ground, and coupling means operatively associated with said main and wing disk gangs for effecting driving rotational movement therebetween, said coupling means comprising first and second coupling members each of which is secured in axial relation to one of the main and wing disk gangs, one of said coupling members including a conical truncated portion slidably supported on its associated disk wing along the axis of the associated rotatable disk and having a plurality of radial drive lugs, and the other of said coupling members having a truncated conical recess conforming to configuration of said conical truncated portion with a plurality of radial recesses conforming to the shape and spacing of said radial drive lugs, said first and second coupling members being cooperable upon said wing disk being moved to said second position to allow said conical truncated portion of said one member to seat into said conforming recesses of said other member to provide positive driving rotational coupling therebetween, said one coupling member further includes a coupler base having a base plate and a square drive shaft which is perpendicular to said base plate and which is axially aligned with and rotatable with the associated rotatable disks, said conical truncated portion being axially slidable on said square drive shaft and conjointly rotatable therewith, and a compression spring disposed about said square drive shaft and between said base plate and said conical truncated portion to allow sliding movement of said truncated portion when said first and second coupling members are brought into engaging relation with said drive lugs in rotational non-alignment with said radial recesses in said other of said coupling members.

2. The combination of claim 1 including keeper means limiting outward movement of said conical truncated portion of said one of said coupling members.

3. The combination of claim 1 wherein said coupler base has a recess therein shaped to receive said conical truncated portion when moved in a direction opposed to the biasing force of said biasing means.

4. The combination of claim 1 wherein said radial drive lugs on said conical truncated portion are equally spaced drive lugs and said radial recesses in said other coupling member are four equally spaced radial recesses.

* * * * *